United States Patent [19]

Okita et al.

[11] Patent Number: 4,639,595
[45] Date of Patent: Jan. 27, 1987

[54] OPTICAL ROTARY ENCODER

[75] Inventors: Masao Okita; Hiroyasu Miyata, both of Furukawa, Japan

[73] Assignee: Alps Electric Co., Ltd., Japan

[21] Appl. No.: 581,661

[22] Filed: Feb. 21, 1984

[30] Foreign Application Priority Data

Feb. 21, 1983 [JP] Japan .................................. 58-26375

[51] Int. Cl.[4] .............................................. G01D 5/34
[52] U.S. Cl. .............................................. 250/231 SE
[58] Field of Search ..................... 250/231 SE, 231 G; 356/395; 340/347 P; 324/175

[56] References Cited

U.S. PATENT DOCUMENTS

| | | | |
|---|---|---|---|
| 3,942,112 | 3/1976 | Westbrook | 324/175 |
| 4,093,853 | 6/1978 | Hunt | 250/231 SE |
| 4,162,399 | 7/1979 | Hudson | 250/231 SE |
| 4,289,962 | 9/1981 | Palloch et al. | 250/231 SE |
| 4,317,032 | 2/1982 | Hanus et al. | 250/231 SE |
| 4,327,362 | 4/1982 | Hoss | 250/231 SE |
| 4,387,299 | 6/1983 | Akiyama | 324/175 |
| 4,500,870 | 2/1985 | Krohn et al. | 250/231 SE |
| 4,512,184 | 4/1985 | Ernst et al. | 250/231 SE |

Primary Examiner—David C. Nelms
Assistant Examiner—Michael Messinger
Attorney, Agent, or Firm—Guy W. Shoup

[57] ABSTRACT

An improved rotary encoder where trackability and durability is an improved and a wider installation field is no longer necessary. Particularly, a rotary encoder and a rotary driver are separated. In the rotary encoder, a rotor is provided and its circumference is provided with a reflection surface and other surface resulting in reflectivity difference. Concave and convex parts are formed at the circumference of rotor and the upper surface of convex part providing the reflecting surface. A light emitting part and the light receiving part are arranged closely so that their end surfaces placed in contact through a flat contact surface, and thereby a sufficient output voltage can be obtained as compared with the other end surface structure. Moreover, the light emitting part and light receiving part are arranged adjacent circumference of the, and rotor, and adequate space is formed between the rotor and holding means for assuring free rotation under the no contact condition.

7 Claims, 17 Drawing Figures

OPTICAL ROTARY ENCODER

FIELD OF THE INVENTION

This invention relates to an improvement in an optical rotary encoder and more specifically to an optical rotary encoder which has improved trackability and rigidity and also requires narrower installation space.

BACKGROUND OF THE INVENTION

Currently, an optical rotary encoder shown in FIG. 1 and FIG. 2 has been proposed. In these figures, 1 indicates a rotary driver and 2 indicates a rotating shaft. A driving force output from the rotary driver 1 is transmitted to an external device not shown through a gear 3 provided to the rotating shaft 2. 4 indicates an optical rotary encoder and its shaft 5 is projected externally and is coupled to the rotating shaft 2 through a jointer 6. The shaft 5 is rotatably supported by the ball bearings 7, 7 and a rotor 8 is fitted between these ball bearings 7, 7. The rotor 8 is composed of a fitting member 9 fixed to the shaft 5 and a disk 10 fixed thereto. The disk 10 is provided with plurality of slits (not shown) formed along the circumferencial direction. 11, 12 are respectively a light emitting element and a light sensing element and these are arranged face to face at the position of slit provided on the disk 10. The lead wires 13, 14 are connected to an electric circuit comprising an amplifier circuit, waveform shaping circuit etc., and an output from the light receiving element 12 is fed back to a control device (not shown) of the rotary driver 1 through such electrical circuit.

When the rotary driver 1 operates, a driving force is transmitted to external device and simultaneously the disk 10 in a rotary encoder 4 rotate. Therefore, the light emitted from the light emitting element 11 to the disk 10 passes intermittently through the disk 10 owing to the slits and the light is received by the light receiving element 12 as the light signal containing data of rotating speed of rotary driver 1. The light signal thus obtained is converted to an electrical signal by the light receiving element 12 and is fed back to a control device of the rotary driver 1 through an electrical circuit. Therefore, a rotating speed of the rotary driver 1 is controlled and accordingly operation of external device is controlled.

But, such a conventional optical rotary encoder is always accompanied by following disadvantages. Namely, since the shaft 5 of rotary encoder 4 has been coupled to a rotating shaft 2 of the rotary driver 1 through a jointer 6 which is provided for absorbing eccentricity of axial center, wider installation space has been required. In addition, the shaft 5 may not sometimes perfectly follow rotation of the rotating shaft 2.

Moreover, since the shaft 5 is supported by the ball bearings 7, 7, rotating torque and rotating speed are inevitably limited and simultaneously the shaft cannot bear the use for a long period of time.

SUMMARY OF THE INVENTION

This invention is proposed considering such disadvantages and is intended to provide an optical rotary encoder which has improved trackability and durability and also does not require wider installation space.

In order to attain such objects, this invention provides an optical rotary encoder wherein a reflecting surface which reflects a light from the light emitting part to the light receiving part is formed at a part of the outer circumference of a rotor, holding members which hold the light emitting part and receiving part toward the outer circumference of rotor are provided at the surrounding of the rotor, positioning engaging part and engaged part are respectively formed to the rotor and holding member so that the light emitting part and receiving part are arranged with the specified interval from the outer circumference of rotor, when the positioning engaging part and engaged part are engaged each other and the holding member which mounts the rotor to the rotating shaft is fixed to the rotary driver, the engaging condition is released and simultaneously the rotor is moved and fixed to the rotating shaft in the specified positional relation to the light emitting and receiving parts.

BRIEF DESCRIPTION OF THE DRAWINGS

FIG. 1 shows that an optical rotary encoder is joined to a rotary driver, while FIG. 2 is a sectional view of internal structure of an optical rotary encoder.

FIG. 3 indicates an optical rotary encoder and a rotary driver joined to each other.

FIG. 5 is a front view of a rotary encoder indicating that a lock spring is locking the rotor. FIG. 6 is a front view of a rotary encoder where the lock is released.

FIG. 8 is a sectional view along the line VIII—VIII in FIG. 5 where the rotor is temporarily held to a holding member. FIG. 9 is a sectional view along the line IX—IX of FIG. 6 indicating that a rotary encoder is completely assembled.

FIG. 14 indicates a detection head having the structure that the light sending and light receiving parts are simply arranged in contact through the circular end surface.

FIG. 17 is similar to FIG. 13, showing an output characteristic of the detection head shown in FIG. 16.

DETAILED DESCRIPTION OF THE INVENTION

This invention is described in detail with reference to the drawings. The same or similar portions to those in the conventional one are given the same reference symbols and repeated explanation is omitted.

Figure 1:
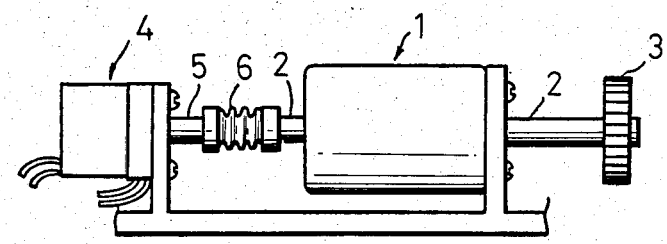
FIG. 1 and FIG. 2 show a conventional optical rotary encoder.
Figure 2:
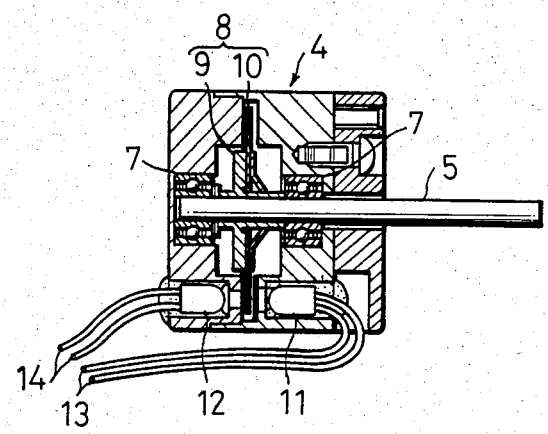
Figure 3:
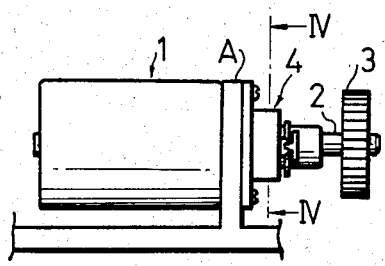
FIG. 3 show an embodiment of an optical rotary encoder to which this invention is applied.
Figure 4:
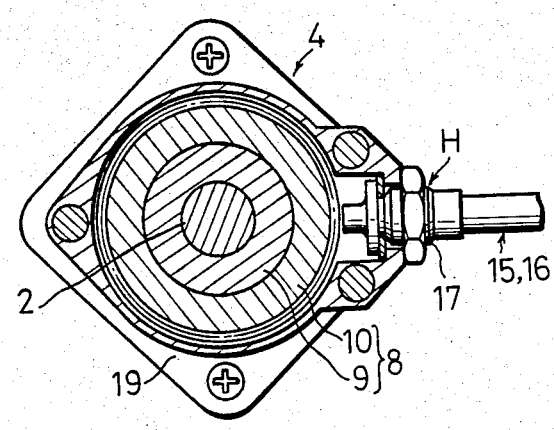
FIG. 4 shows a sectional view along the line IV—IV.

FIG. 3 and show an embodiment of this invention. This rotary encoder is configurated as follow. Namely, a rotor 8 is composed of a fitting member 9 being fixed to a rotating shaft 2 with a screw S and a disk 10 fixed to such fitting member 9. The axial center of such fitting memer 9 and disk 10 is aligned to that of the rotating shaft 2.

At the circumference of the fitting member 9, a positioning engaging part 20, a relief part 21, a positioning engaging part 22 and a relief part 23 are formed, and the external diameter of relief 21 is smaller than the external diameter of positioning engaging part 20, while the external diameter of relief 23 is smaller than the external diameter of positioning engaging part 22. In addition, the relief part 23 is formed with annular grooves 24, 25.

The disk 10 is formed like a flat gear with formation of concave and convex parts at the circumference, considering the upper surface of convex part as the reflecting surface R.

Figure 12:
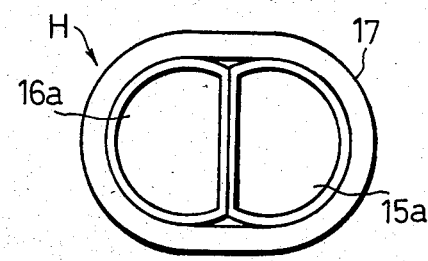
FIG. 12 is a plan view of detection head having the structure that the light sending and light receiving parts having the bowed end surface are closely arranged in contact through the flat furface.

A detection head H is arranged adjacent to the circumference of such disk 10. At the end portion of the detection head H opposing to the circumference of disk 10, a light emitting part 15a and light receiving part 16a are provided, and the light emitting part 15a and light receiving part 16a respectively form the end surfaces of the light sending fiber 15 and light receiving fiber 16. As shown in FIG. 12, such end surfaces are formed like bows, and these are held by a head metal fitting 17 with the sides arranged in close contact through the flat surface. The head metal fitting 17 is clamped to a holding member 19 by means of a nut 18.

The other end portions not shown of these fibers 15, 16 are respectively provided with a light emitting element and light sensing element (not shown) opposing to the end surfaces. As in the case of the conventional device, these light emitting element and light sensing element are connected to an electrical circuit (not shown) comprising amplifier, waveform shaping circuit etc., and an output of the light sensing element is fed back to a control device (not shown) of the rotary driver 1 through such electrical circuit. In the case of this embodiment, both light emitting element and light sensing element are provided adjacent to the control device of rotary driver 1 together with the electrical circuit in view of extremely reducing addition of noises and the light emitting element, light sensing element and the circumference of disk 10 are connected through the fibers 15, 16.

Figure 9:
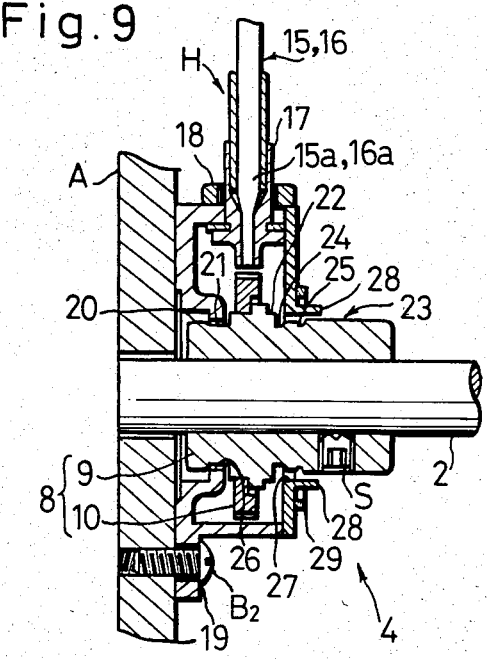

On the other hand, the holding member 19 is screwed by screws $B_1$, $B_2$ to a supporting member A to which the rotary driver 1 is fixed and thereby the light sensing part 15a and light receiving part 16a are opposed to the circumference of disk 10 in the specified positional relationship. The holding member 19 is provided with the positioning engaged parts 26, 27, these positioning engaged parts 26, 27 respectively have such internal diameter being engaged with the positioning engaging parts 20, 22, but at the time of completing the assembling, the positioning engaged parts 26, 27 are respectively opposing to the relief parts 21 and 23, and are not in contact with the fitting member 9 (refer to FIG. 9). 28, 28 are engaging pieces (refer to FIG. 7) which are provided at the surrounding of fitting member 9 for being engaged with the lock spring 29. When assembling is completed, the lock spring 29 is held in such a condition as being widened by these engaging pieces 28, 28 and is not in contact with the fitting member 9 (refer to FIG. 6).

Figure 8:
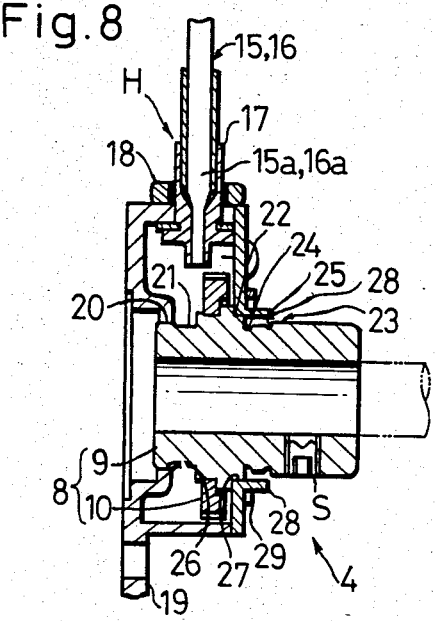
FIG. 8 and FIG. 9 show operation of rotor to a holding member.

The assembling procedures are explained below. First, the positioning engaging parts 20, 22 are respectively engaged with the positioning engaged parts 26, 27 in order to temporarily hold the rotor 8 to the holding member 19. At this time, the lock spring 29 engaged with the engaging pieces 28, 28 are locking the rotor 8 through fitting into the annular groove 24 of the fitting member 9, thereby preventing that the engaging condition between the positioning engaging parts 20, 22 and positioning engaged parts 26, 27 are carelessly released (refer to FIG. 5). Under this condition, the light sending part 15a and light receiving part 16a are set keeping the specified interval from the circumference of the disk 10 forming the rotor 8 (refer to FIG. 8).

Here, the rotary encoder 4 in such a condition is assembled to the rotary driver 1. Namely, before mounting the gear 3 to the shaft 2, the rotating shaft 2 is inserted into the through hole of the fitting member 9 and the holding member 19 is screwed to the supporting member A by the screws $B_1$, $B_2$. At this time, since the rotor 8 is temporarily held to the holding member 19, the holding member 19 is fixed to the supporting member A in such a location as setting the light sending part 15a and light receiving part 16a with the specified interval from circumference of the disk 10. Thereafter, when the rotor 8 is pushed inwardly to the rotating shaft 2, the engaging condition between the positioning engaging parts 20, 22 and positioning engaged parts 26, 27 is released and the positioning engaged parts 26, 27 are not in contact with the fitting member 9 being opposed respectively to the relief parts 21, 23. Simultaneously, the lock spring 29 engaged with the engaging pieces 28, 28 is made free from the annular groove 24 and then falls into the annular groove 25, locking again the rotor 8. Thereby, the rotor 8 is aligned with the light sending part 15a and light receiving part 16a in the direction toward axial center. Since the light sending part 15a and light receiving part 16a are arranged toward circumference of the disk 10, particular accuracy is not required for alignment toward the rotor 8 to the light sending part 15a and light receiving part 16a in the direction of axial center. Therefore, it is allowed the rotor 8 has a little play to the holding member 19 in the direction toward axial center.

Figure 5:
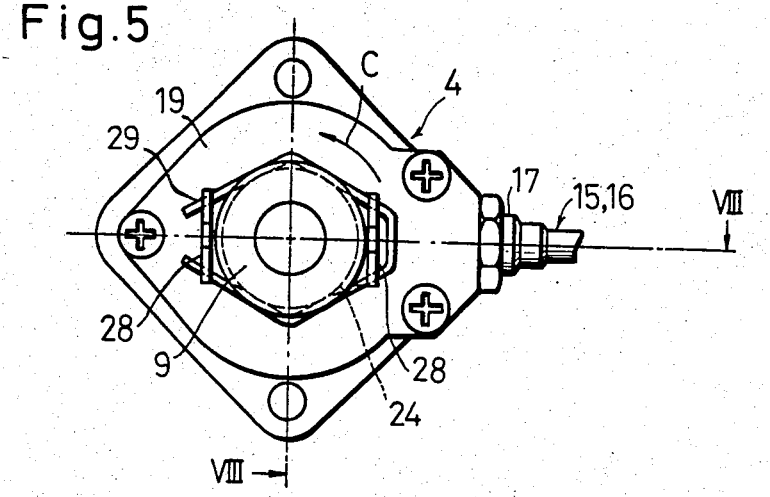
FIG. 5 and FIG. 6 indicate operation of a lock spring.
Figure 6:
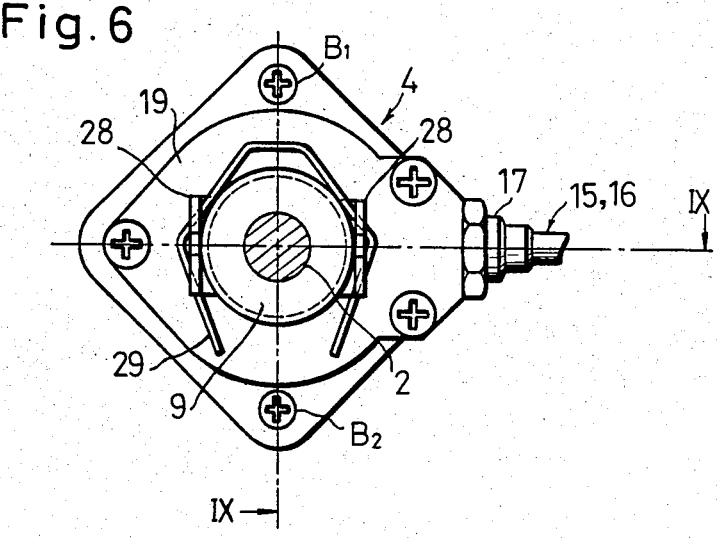
Figure 7:
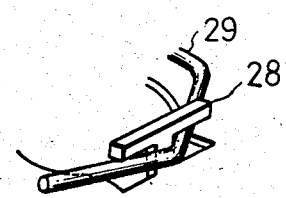
FIG. 7 shows the condition that a lock spring is enaged with an engaging piece.

Then, the screw S is driven toward the rotating shaft 2 and the rotor 8 being set in the specified positional relationship to the light sending part 15a and light receiving part 16a is fixed to the rotating shaft 2. Thereafter, the lock spring 29 in the condition of FIG. 5 is rotated in the direction C and set in the condition as shown in FIG. 6. At this time, since the lock spring 29 is held in the condition as being widened by the engaging pieces 28, 28, the lock spring 29 gets out of the annular groove 25, releasing the locking condition and is not in contact with the fitting member 9.

Thus, the rotary encoder 4 has been assembled, and the rotor 8 is set in the specified positional relationship to the light sending part 15a and light receiving part 16a and simultaneously it is not in contact with the holding member 19.

Therefore, the gear 3 is mounted to the rotating shaft 2 and moreover an external device (not shown) may be mounted.

Figure 10:
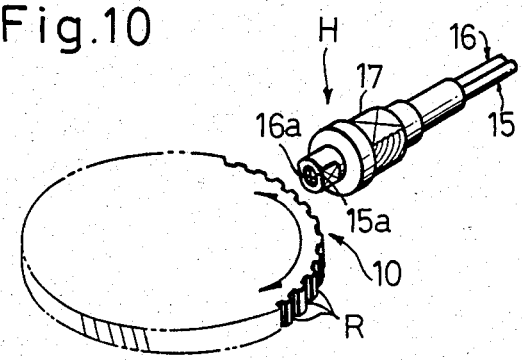
FIG. 10 indicates arrangement of the light emitting part and light receiving part to a disk.
Figure 11:
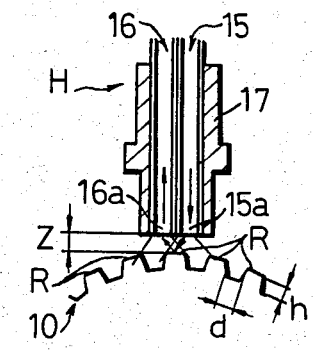
FIG. 11 shows a path of light being sent or received between the light emitting and light receiving parts and circumference of disk.

Operation of such rotary encoder is explained. When the rotary driver 1 operates, a driving force is transmitted to an external device and simultaneously the disk 10 in the rotary encoder 4 rotates. Accordingly, the light which is guided from the light emitting element (not shown) by the light sending fiber 15 and directed to the circumference of disk 10 by the light-sending part 15a is intermittently reflected by the reflecting surface R and is received by the light receiving part 16a as the light signal containing data of rotating speed of the rotary driver 1 (refer to FIG. 10 and FIG. 11). The light signal received by the light receiving part 16a is then guided to the light receiving fiber 16. After being converted into an electrical signal by a light sensing element (not shown), the signal is fed back to the control device (not shown) of the rotary driver 1. Thereby a rotating speed of the rotary driver 1 is controlled and as a result, operation of external device can be controlled.

Figure 13:
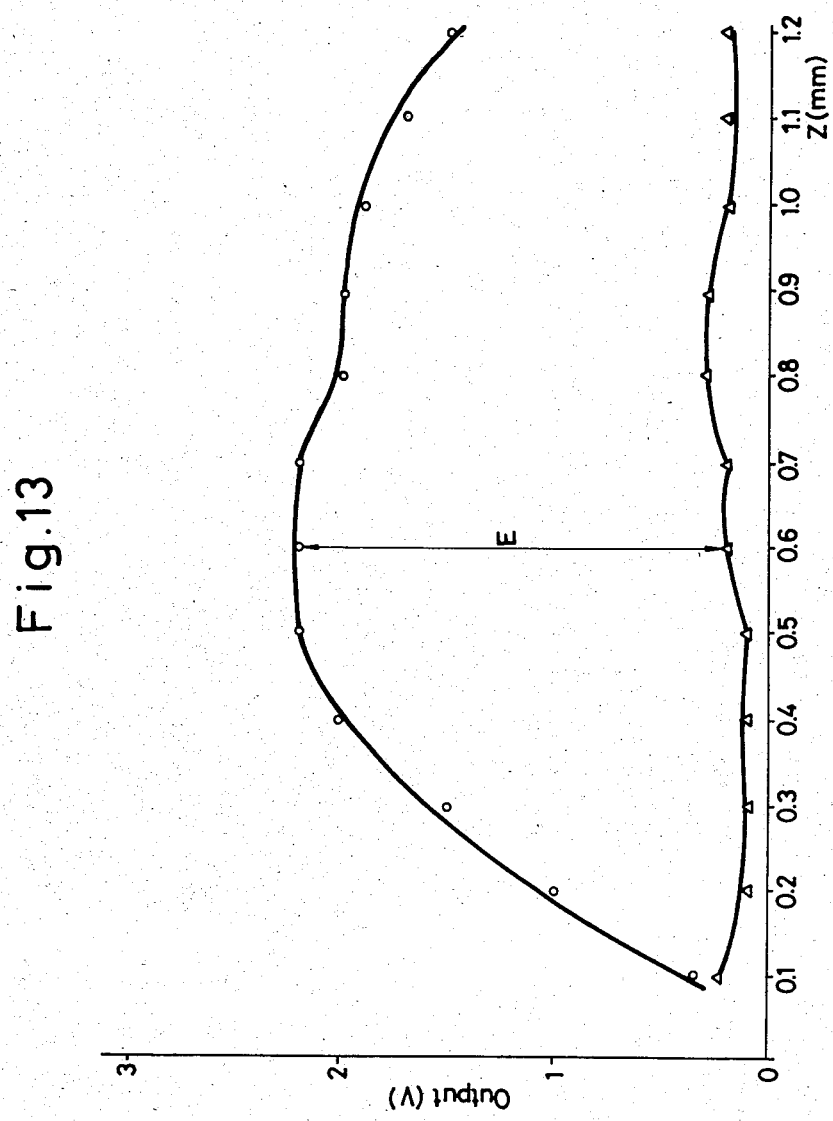
FIG. 13 shows an output characteristic of the detection head shown in FIG. 12.

FIG. 13 shows an output characteristic of this embodiment. Namely, this output characteristic is obtained by the detection head having the end surface shown in FIG. 12. The horizontal axis indicates an opposing distance Z (refer to FIG. 11) between the upper surface of convex part at the circumference of the disk 10 and the detection head H, while the vertical axis an output voltage obtained when the light signal sent from the light receiving fiber 16 is converted into an electrical signal by an light sensing element and then amplified by an electrical circuit.

In this figure, a curve indicated by triangles means output voltage characteristic when the detection head H is opposing to the bottom part of said concave part, while a curve indicated by circles means output voltage characteristic when the detection head H is opposing to the upper surface of convex part. At this time, the height h of upper surface of convex part to the bottom surface of concave part is 0.16 mm and average distance between convex parts d is 0.25 mm (refer to FIG. 11).

Figure 14:
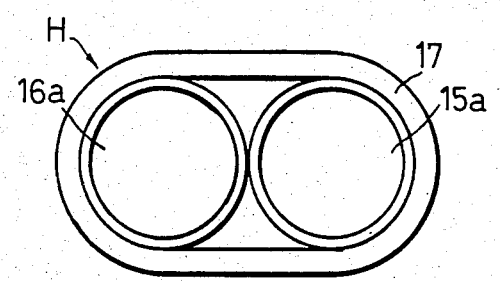
FIG. 14 and FIG. 17 show close contact conditions of the light sending and light receiving parts in the detection head and relationship between such contact conditions and output characteristic.

The detection head H shown in FIG. 14, different from this embodiment, has the structure that both light sending part 15a and light receiving part 16a are held by the head holding metal 17 while the end surface is kept circular. Therefore, these have no flat contact surface. An output characteristic of such detection head H is as shown in FIG. 15.

Figure 15:
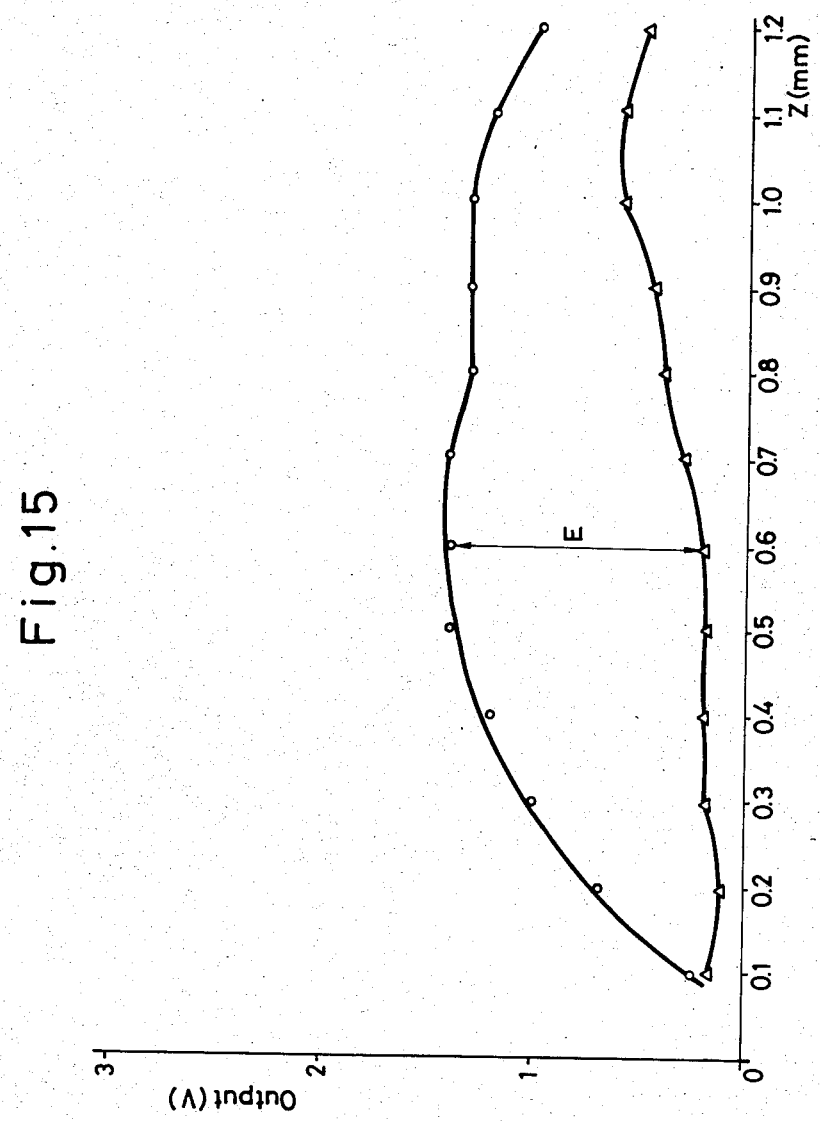
FIG. 15 is similar to FIG. 13, showing an output characteristic of the detection head shown in FIG. 14.

As is obvious from comparison between FIG. 13 and FIG. 15, an output voltage obtained when the detection head is facing to the upper surface of convex part and an output voltage obtained when the detection head is facing to the bottom surface of concave part produce a voltage difference E, which becomes larger when the detection head H shown in FIG. 12 is used while the opposing distance Z is the same as that obtained when the detection head H shown in FIG. 14 is used. Namely, when the detection head H shown in FIG. 12 is used, data can be transmitted more accurately than when the detection head H shown in FIG. 14 is used, because the light sent from the light sending part 15a can be collected by the light receiving part 16a more effectively when the light sending part 15a and light receiving part 16a are closely in contact through the flat surface. In addition, since a voltage difference E appearing in FIG. 13 shows a high level for a wide range of opposing distance Z, it is no longer necessary to strictly set such opposing distance Z and manufacturing of rotary encoder becomes as much easier.

Figure 16:
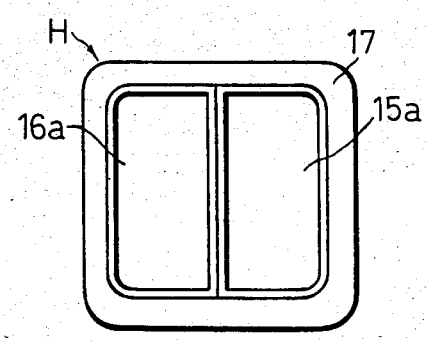
FIG. 16 is a plan view of a detection head in such a structure that the light emitting and light receiving parts having rectangular end surface are arranged in contact through the flat surface.
Figure 17:
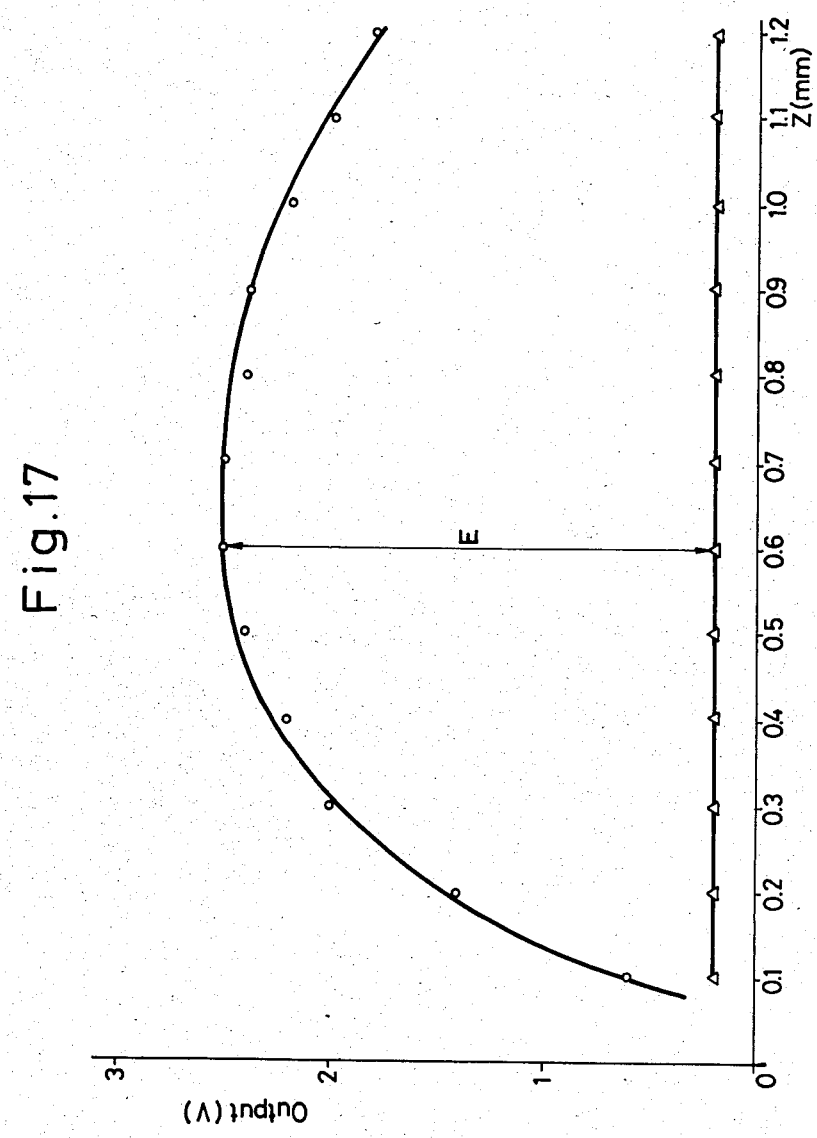

The detection head H shown in FIG. 16 has the cross sectional view, as in the case of FIG. 12, that the light sending part 15a and the light receiving part 16a are arranged in contact through the flat surface, but difference from FIG. 12 is that the end surface of the light sending part 15a and light receiving part 16a is formed rectangular. In this case, an output characteristic is shown in FIG. 17, which also shows an advantage similar to that when the detection head H shown in FIG. 12 is used.

In this embodiment, the concave and convex portions are formed at the circumference of the disk forming the rotor and the upper surface of convex part is considered as the reflecting surface R, but the structure is not limited only to such profile and it is enough that the reflecting surface R which reflects the light sent from the light emitting part to the light sensing part is provided at a part of the circumference of the rotor.

Moreover, in the above embodiment, a light emitting element and a light sensing element are separated from the rotary encoder and these light emitting and sensing elements and the circumference of rotor are connected through the light sending fiber and light receiving fiber. In this case, other modifications are also possible, for example, a light emitting element and a light sensing element can be mounted directly to the rotary encoder. Namely, it is enough that the light sending part is capable of sending the light to the circumference of the rotor, while the light receiving part is capable of receiving the light reflected from the circumference of the rotor.

As explained above, according to this invention, an optical rotary encoder provides following effects because it has the following structure that a reflecting surface which reflects light from the light emitting part to the light receiving part is formed at a part of the outer circumference of a rotor, holding members which hold the light emitting part and receiving part toward the outer circumference of rotor are provided at the surrounding of the rotor, positioning engaging part and engaged part are respectively formed to the rotor and holding member so that the light emitting part and receiving part are arranged with the specified interval from the outer circumference of the rotor, when the positioning engaging part and engaged part are engaged to each other and the holding member which mounts the rotor to the rotating shaft is fixed to the rotary driver, the engaging condition is released and simultaneously the rotor is moved and fixed to the rotating shaft in the specified positional relation to the light emitting and receiving parts.

(1) Since the rotor is directly fixed to the rotating shaft of the rotary driver, the encoder can be compactly built into the rotary driver, not requiring wider installation space and improving trackability to the rotating shaft of the rotary driver.

(2) Since the rotor of rotary encoder rotates under the no contact condition, there is no limit to a rotating torque and rotating speed and moreover it can be used almost permanently.

(3) The reflecting surface which reflects the light sent from the light emitting part to the light receiving part is formed at the circumference of the rotor and the light emitting part and light receiving part are also formed at the circumference of the rotor, and thereby, a little play in the rotating shaft direction of the rotor does not give any influence on the light signal, and it is no longer necessary to adjust the play at the time of assembling of the rotary encoder and accordingly the number of manufacturing steps can be reduced.

What is claimed is:

1. In an optical rotary encoder for providing rotation signals indicative of rotation of an associated device, said encoder comprising an encoder shaft (2), a shaft fitting member (9) mounted on said encoder shaft, a rotor disk (10) fixed to said shaft fitting member and having at least one light reflecting element on its circumference, a housing (4) for said rotor disk, and an optical detection head (H), having a light emitting part (15a) and a light receiving part (16a), which is mounted in said housing at an axial position corresponding to an operative position of said rotor disk wherein light from said light emitting part can be reflected by said light reflecting element on the circumference of said rotor disk and received by said light receiving part for detection of rotation of said rotor disk, the improvement of said encoder further comprising:
said shaft fitting member (9) and said rotor disk (10) being axially movable on said encoder shaft (10) from an assembly position to the operative position, said shaft fitting member having formed on one end thereof a first positioning engaging part (20) axially spaced apart from a first relief part (21);
means for locking said shaft fitting member (9) on said encoder shaft (2) at said operative position;
said housing (4) including a holding member (19) having a positioning engaged part (26) which engages said first positioning engaging part (20) of said shaft fitting member (9) to hold said rotor disk (10) fixed relative to said housing in said assembly position during assembly, said shaft fitting member and rotor disk being movable axially in said housing to said operative position and locked by said locking means to said shaft at said operative position upon completion of assembly, wherein said first positioning engaged part (26) of said holding member (9) is disposed opposite and without contacting said first relief part (21) of said shaft fitting member such that said rotor disk is rendered rotatable relative to said housing.

2. An optical rotary encoder according to claim 1 further comprising:
said shaft fitting member (9) having formed on the other end thereof a second positioning engaging part (22) axially spaced apart from a second relief part (23);
said housing (4) having a second positioning engaged part (27) which engages said second positioning engaging part (22) of said shaft fitting member (9) to hold said rotor disk (10) fixed relative to said housing in said assembly position during assembly, said shaft fitting member and rotor disk being movable axially in said housing to said operative position and locked by said locking means to said shaft at said operative position upon completion of assembly, wherein said second positioning engaged part (27) of said housing is disposed opposite and without contacting said second relief part (23) of said shaft fitting member such that said rotor disk is rendered rotatable relative to said housing.

3. An optical rotary encoder according to claim 1 further comprising:
first and second grooves (24, 25) formed on the other end of said shaft fitting member (9) axially spaced apart from each other;
said housing (4) having engaging means (28, 29) which engages said first groove (22) of said shaft fitting member (9) to hold said rotor disk (10) fixed relative to said housing in said assembly position during assembly, said shaft fitting member and rotor disk being movable axially in said housing to said operative position and locked by said locking means to said shaft at said operative position upon completion of assembly, wherein said engaging means (28, 29) engages said second groove (25) of said shaft fitting member (9) to hold said rotor disk (10) fixed relative to said housing in said operative position, said engaging means being releasable from said second groove such that said rotor disk is rendered rotatable relative to said housing.

4. An optical rotary encoder according to claim 3 wherein said engaging means comprises a pair of engaging pieces (28) disposed opposite each other on opposite sides of said shaft fitting member, and a lock spring (29) which is retained in a locking position on said engaging pieces such that a portion of said lock spring is pressed in contact in said groove of said shaft fitting member, said lock spring being movable to a release position with respect to said engaging pieces wherein said portion of said lock spring is radially displaced out of contact with said grooves so as to release said shaft fitting member and rotor disk.

5. An optical rotary encoder according to claim 1, wherein said circumference of said rotor disk is formed with alternating raised reflecting elements and indented non-reflecting elements.

6. An optical rotary encoder according to claim 1, wherein said detection head is disposed closely adjacent a circumferential position of said rotor disk, and said light emitting and light receiving parts consist respectively of light emitting and light receiving optical fiber ends disposed side-by-side and joined along a flat planar surface.

7. An optical rotary encoder according to claim 1, wherein said encoder shaft (10) is formed as an integral unit with an output shaft of said associated device, whereby said encoder unit can be assembled on said shaft at the time of assembly of said associated device.

* * * * *